Feb. 14, 1956 H. J. WOOD 2,734,443
ENCLOSURE AIR SUPPLY SYSTEM
Filed Oct. 18, 1951
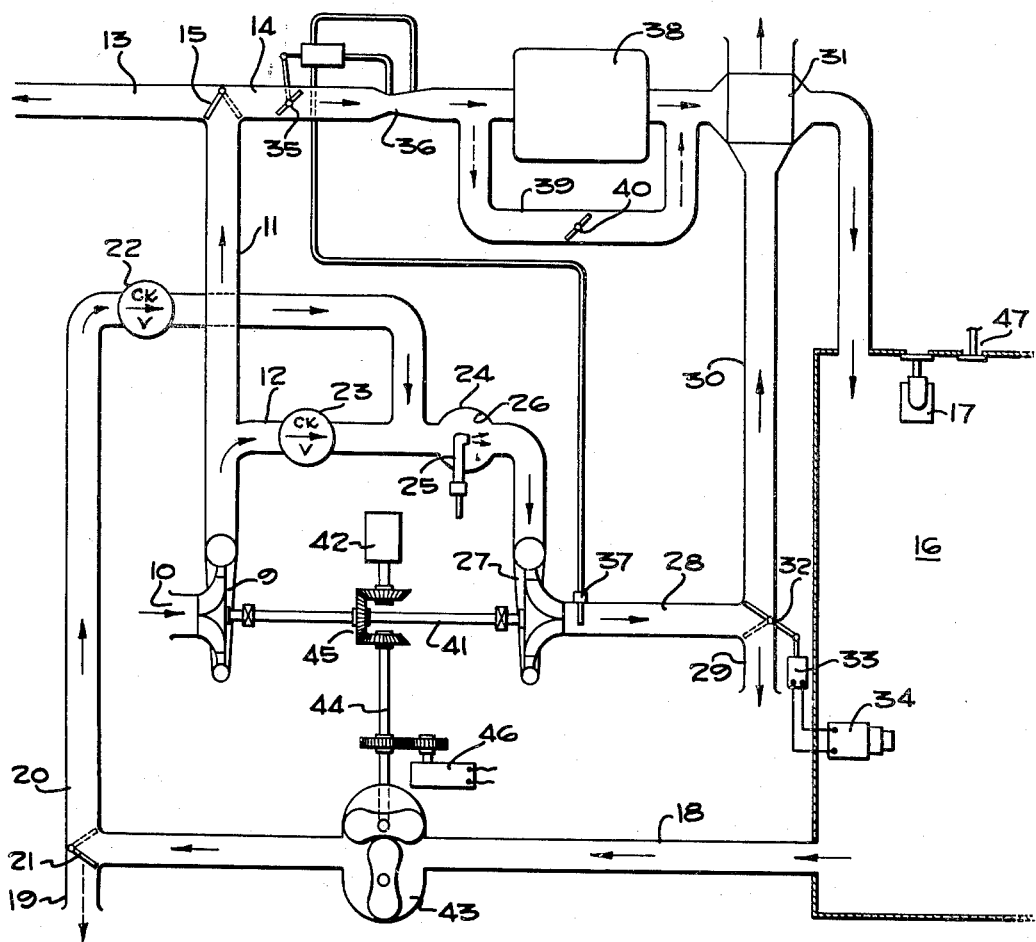
HOMER J. WOOD,
INVENTOR.
BY
ATTORNEY

United States Patent Office 2,734,443
Patented Feb. 14, 1956

2,734,443

ENCLOSURE AIR SUPPLY SYSTEM

Homer J. Wood, Sherman Oaks, Calif., assignor to The Garrett Corporation, Los Angeles, Calif., a corporation of California Application October 18, 1951, Serial No. 251,918

11 Claims. (Cl. 98—1.5)

The present invention relates generally to air supply systems for enclosures, and is more particularly concerned with the conditioning and pressurization of enclosures and spaces, such as cabins and other compartments of aircraft.

It is one object of the present invention to provide a simple, efficient and self-sustaining air supply system in which the compressor is driven by combustion power means, such as a gas turbine, supplied with exhaust air from the enclosure, and in which the turbine is also connected to a positive displacement pump acting under certain operating conditions as a power recovery device, and at other times to maintain a substantially constant pressure ratio across the turbine during altitude changes.

A further object is to provide in a system of the character described, positive displacement pumping means in the exhaust air stream from the enclosure for controlling flow from the enclosure and stabilizing the system.

A further object of the invention resides in the provision of a compressor bleed-off connection which may be utilized for pneumatic power purposes, such as for starting the main engines of the aircraft, etc.

A still further object is to utilize in an air supply system a compressor and positive displacement pumping means which are connected through check valves in such manner as to cooperatively furnish combustion air from the ambient atmosphere and the enclosure exhaust air stream to a combustion engine or hot gas turbine by which they are driven.

Another object is to provide a system of the character described wherein the outlet from a positive displacement pump is selectively connectible to supply enclosure exhaust air at increased pressure to the turbine of a turbine driven compressor unit or discharge the enclosure exhaust air directly to atmosphere.

Still another object is to provide an arrangement wherein the turbine exhaust may be selectively discharged to ambient atmosphere or directed into heat exchange relation with enclosure inlet air in accordance with enclosure temperature changes.

It is also an object to provide an air supply system wherein the supply of air to the enclosure is modulated in response to turbine exhaust temperature changes.

Further objects of the invention will be brought out in the following part of the specification, wherein detailed description is for the purpose of fully disclosing the invention without placing limitations thereon.

Referring to the accompanying drawings, which are for illustrative purposes only, the single figure schematically illustrates an enclosure air supply system embodying the features of the invention.

Referring generally to the drawing, for illustrative purposes, the enclosure air supply system of the present invention is shown and described in the present instance as being applied to an aircraft enclosure, such as an aircraft cabin. It will be appreciated however that it is not intended that the invention be limited to such specific use, since it may be utilized for other spaces with equal facility.

More specifically, enclosure air is supplied by a compressor 9 having its inlet 10 arranged to receive ambient air. The discharge from the compressor is through a divided flow path formed by conduits or ducts 11 and 12 respectively.

The duct 11 connects with a divided flow path composed of branch ducts 13 and 14, flow to these ducts from duct 11 being selectively controllable by means of a valve 15. The branch duct 13 forms a bleed-off connection by means of which compressed air may be distributed to a point of use for the operation of pneumatic devices, for example, the starting equipment for the main engines, etc. The duct 14 is arranged to conduct inlet air to the enclosure, shown as an aircraft cabin 16 in which the pressure is maintained and regulated by a conventional outflow valve 17.

Exhaust cabin air is carried through a connection duct 18 which connects with a divided flow path formed by a discharge duct 19 to atmosphere and a duct 20, flow into these ducts being selectively controllable through a selector valve 21.

The duct 20 is connected through a reverse flow check valve 22 with duct 12, a check valve 23 being provided in duct 12 to prevent back flow into the compressor 9.

Flow from duct 12 is combined with the flow from duct 20 and supplied to a heat energy source shown in this instance as a combustor 24 in which a combustible fuel is supplied through a nozzle 25 into a combustion chamber 26 from which the products of combustion are carried to the inlet side of a turbine 27. The exhaust side of this turbine is connected with a discharge duct 28 leading to a divided flow path formed by a discharge duct 29 to atmosphere and a duct 30 by which the exhaust gases are carried to a heat exchanger 31 in the path of air flow to the cabin 16, the exhaust gases being brought into heat exchange relation with the inlet air to the cabin. The flow into ducts 29 and 30 is controlled selectively by means of a selector valve 32 connected with an actuator 33 under control of temperature responsive means 34 located in the cabin and varied in accordance with changes in the temperature of the cabin air.

The flow of air supplied to the cabin is modulated by a control valve 35 having an actuator responsive to flow changes through a venturi 36, and further controlled in response to variations in temperature sensing means 37 located in the exhaust flow from turbine 27.

Upstream from the heat exchanger 31, there is located suitable refrigerating mechanism, as generally indicated by numeral 38, of conventional construction. A by-pass duct 39 is provided around the refrigerating mechanism, this duct being under control of a valve 40 which may be manually or automatically controlled so as to vary the amount of air passing through the refrigerating mechanism, and as a consequence the amount that the air flowing to the cabin will be cooled. Where heating is required, this is accomplished by conducting the turbine exhaust gases through duct 30 and the heat exchanger 31 from whence it may be discharged to ambient atmosphere.

The turbine 27 is connected through a suitable power transmission connection, such as a shaft 41 with the compressor 9 which it drives, and as thus connected may form a gas turbine compressor power unit which is independent of the driving engines of the aircraft. Operation of the power unit is initiated by means of a starter 42, in a conventional manner.

The system as thus far described is susceptible of utilization to provide an air supply for the aircraft cabin, but has the disadvantage that under certain flight conditions, the falling off of the pressure ratio of the cabin to atmosphere will result in a decrease in the pressure ratio across the turbine, and full capacity from the unit is not available, and the system is more or less unstable.

With a view to increasing the efficiency of operation, the present system includes as one of its important features a positive displacement compressor 43 which is positioned in the cabin exhaust air flow duct 18 and connected through a driving shaft 44 and suitable gearing 45 for actuation by the turbine 27. The positive displacement compressor 43 acts as a positive control for the exhaust air flow from the cabin, and under flight conditions where the pressure ratio across the turbine has fallen off, the compressor 43 serves to hold the pressure ratio across the turbine at a substantially constant value, so that full capacity is available from the power unit, and this unit, being self-sustaining, provides a reliable and efficient air supply source for pressurizing and conditioning of the aircraft cabin.

A generator 46 may be connected for drive from the power unit to furnish electric power for required purposes, thus increasing the usefulness of the present system of this invention.

Under certain conditions of operation, it is contemplated that the positive displacement compressor may operate as a power delivery device which will deliver recovered power and assist the turbine 27 in driving the compressor.

The system of the present invention is extremely flexible and readily adapted to the varied conditions and requirements for ground operation and flight conditions at different altitudes.

The system is independent of the main driving engines of the aircraft, and is easily started by means of the starter 42 whenever required. The power unit, after starting, is self-sustaining and for ground operation may be utilized for general power service, being a source of supply for compressed air which is made available for main engine starting purposes and the driving of other pneumatic devices, and for the furnishing of electricity for general service purposes. If required the system may be utilized on the ground for refrigeration of the cabin. When starting the system, the selector valve 21 will be open so as to normally discharge exhaust cabin air to the atmosphere through discharge duct 19. In order to prevent the creation of vacuum in the cabin, when starting up, provision may be made by suitable means for the admission of ambient atmosphere air to the cabin. One way in which this may be accomplished is by providing a vacuum inlet valve 47 which will be arranged to open at a predetermined value of reduced pressure. During ground operation, the positive displacement compressor will simply idle and perform no material function in the system operation, since at this time there will be no differential pressure across the compressor.

At low and intermediate altitudes, the selector valve will remain in open position, and the compressor 43 will absorb no power from the cabin exhaust air. The system will operate as a normal gas turbine compressor power unit. Should conditions exist where the cabin is being pressurized during intermediate altitude conditions, the positive displacement compressor 43 may operate as a power delivery device. Under such circumstances, the power recovered from the cabin exhaust air will be delivered to the shaft 41 and thus assist the turbine 27 in driving the compressor.

One of the most important features of the utilization of a positive displacement compressor 43 lies in its usefulness for high altitude operation. The valve 21 will be closed so as to direct the cabin exhaust air through the duct 20 and thence to the combustor 24. The compressor 43 now acts to control the flow of exhaust air from the cabin and provides stable modulation of the system by maintaining a substantially constant pressure ratio across the turbine. The compressor 43 will normally operate in the high altitudes as an air pumping device. However, at extreme altitudes, under transient conditions, it is possible that the compressor 43 may operate as a power delivery device. The utilization of the compressor 43, thus permits the full compressor flow to be supplied to the cabin, if required.

Various modifications may suggest themselves to those skilled in the art without departing from the spirit of my invention, and, hence, I do not wish to be restricted to the specific form shown or uses mentioned, except to the extent indicated in the appended claims.

I claim:

1. In an air supply system for an enclosure, the combination of: a compressor having an inlet from ambient air; a positive displacement pump having an inlet connected with an air outlet from said enclosure; combustion power means having a driving connection with said compressor and said pump; a divided path discharge connection from said compressor; a divided path discharge connection from said pump, one path of said compressor and one path of said pump each being connected to an air inlet to said power means, the other path from said compressor being connected with an air inlet to said enclosure, and the other path from said pump being connected with ambient atmosphere; reverse flow check valves in said power means connected paths; and valve means for selectively controlling flow from said pump into its respective paths.

2. In an air supply system for an enclosure, the combination of: a compressor having an inlet from ambient air; a positive displacement pump having an inlet connected with an air outlet from said enclosure; combustion power means having a driving connection with said compressor and said pump; a divided path discharge connection from said compressor; a divided path discharge connection from said pump, one path of said compressor and one path of said pump each being connected to an air inlet to said power means, the other path from said compressor being connected with an air inlet to said enclosure, and the other path from said pump being connected with ambient atmosphere; and reverse flow check valves in said power means connected paths.

3. In an air supply system for an enclosure, the combination of: a compressor having an inlet from ambient air; a positive displacement pump having an inlet connected with an air outlet from said enclosure; combustion power means having a driving connection with said compressor and said pump, and having a discharge connection with ambient atmosphere; an inlet air duct from the compressor to said enclosure; and separate connection ducts for supplying combustion air respectively from said compressor and said pump to said power means, whereby the pressure ratio across said power means is maintained substantially constant with altitude changes.

4. In an air supply system for an enclosure, the combination of: a compressor having an inlet from ambient air; a positive displacement pump having an inlet connected with an air outlet from said enclosure; combustion turbine means having a driving connection with said compressor and said pump, and having a discharge connection with ambient atmosphere; an inlet air duct from the compressor to said enclosure; and ducts respectively from the discharge sides of said compressor and said pump having a common connection with said power means, said pump serving to compensate for changes in pressure ratio across said turbine means due to altitude variations.

5. In an air supply system for an enclosure, the combination of: an air compressor having an inlet from ambient atmosphere; a discharge conduit system leading from the compressor to the ambient atmosphere including an inlet air duct to the enclosure and an outlet duct from the enclosure to ambient atmosphere; positive displacement pumping means and a hot gas turbine connected in said outlet duct for series flow therethrough; and a driving connection between said turbine, pump and compressor, whereby the power generated by said turbine is augmented by the power generated by said pump, when the latter operates as a power delivery device.

6. In an air supply system for an enclosure, the combination of: an air compressor having an inlet from ambient air; a hot gas turbine driving said compressor; a divided path discharge conduit system from said compressor, one of said paths leading to said enclosure and the other to said turbine; a check valve in the path to said turbine; positive displacement air pumping means driven by said turbine having an inlet connected to receive outlet air from said enclosure; a divided path discharge conduit from said pumping means, one path connecting with ambient atmosphere and the other connecting with said turbine flow path between said check valve and said turbine; and valve means for controlling the discharge from said pumping means including a path selector valve.

7. In an air supply system for an enclosure, the combination of: an air compressor having an inlet from ambient air; a hot gas turbine driving said compressor; a divided path discharge conduit system from said compressor, one of said paths leading to said enclosure and the other to said turbine; a check valve in the path to said turbine; an enclosure air outlet duct connecting the enclosure with said turbine path between said check valve and the turbine, said outlet duct having a check valve therein; and positive displacement air pumping means in said outlet duct driven by said turbine.

8. In an air supply system for an enclosure, the combination of: an air compressor having an inlet from ambient air; a hot gas turbine driving said compressor; a divided path discharge conduit system from said compressor, one of said paths leading to said enclosure and the other to said turbine; a check valve in the path to said turbine; an enclosure air outlet duct connecting the enclosure with said turbine path between said check valve and the turbine, said outlet duct having a check valve therein; and positive displacement air pumping means driven by said turbine for increasing the pressure of air supplied to said turbine from said outlet duct.

9. In an air supply system for an enclosure, the combination of: an air compressor; an intake to the compressor from ambient atmosphere; a divided path discharge connection from said compressor; one of said paths constituting a pneumatic power bleed-off, and the other of said paths leading to the ambient atmosphere including an inlet air duct to the enclosure and outlet duct from the enclosure to an ambient atmosphere discharge opening; an expansion turbine immediately upstream from the discharge opening of said system and having a driving connection with said compressor; a source of heat arranged to deliver heat energy to the air stream in the discharge conduit system immediately upstream from said turbine; and valve means for selectively controlling flow from said compressor into its respective discharge paths.

10. In an air supply system for an enclosure, the combination of: an air compressor; an intake to the compressor from ambient atmosphere; a discharge conduit system leading from the compressor to the ambient atmosphere including an inlet air duct to the enclosure and an outlet duct from the enclosure to the ambient atmosphere; an expansion turbine immediately upstream from the discharge opening of said system and having a driving connection with said compressor; a source of heat arranged to deliver heat energy to the air stream in the discharge conduit system immediately upstream from said turbine; and means for controlling inlet air flow to said enclosure in response to temperature changes in the discharge gases from said turbine.

11. In an air supply system for an enclosure, the combination of: an air compressor; an intake to the compressor from ambient atmosphere; a discharge conduit system leading from the compressor to the ambient atmosphere including an inlet air duct to the enclosure and an outlet duct from the enclosure to an ambient atmosphere discharge opening; combustion power means immediately upstream from the discharge opening of said system and having a driving connection with said compressor; means for controlling inlet air flow to said enclosure in response to temperature changes in the discharge gases from said combustion power means; and means for diverting discharge gases from said powder means into heat transfer relation with inlet air to the enclosure in response to enclosure temperature variations.

References Cited in the file of this patent

UNITED STATES PATENTS

| | | |
|---|---|---|
| 2,391,838 | Kleinhans et al. | Dec. 25, 1945 |
| 2,479,991 | Wood | Aug. 23, 1949 |
| 2,491,461 | Wood | Dec. 13, 1949 |
| 2,491,462 | Wood | Dec. 13, 1949 |